Sept. 23, 1941.  W. F. HILL  2,256,593
HARROW
Filed Oct. 1, 1940  3 Sheets-Sheet 1
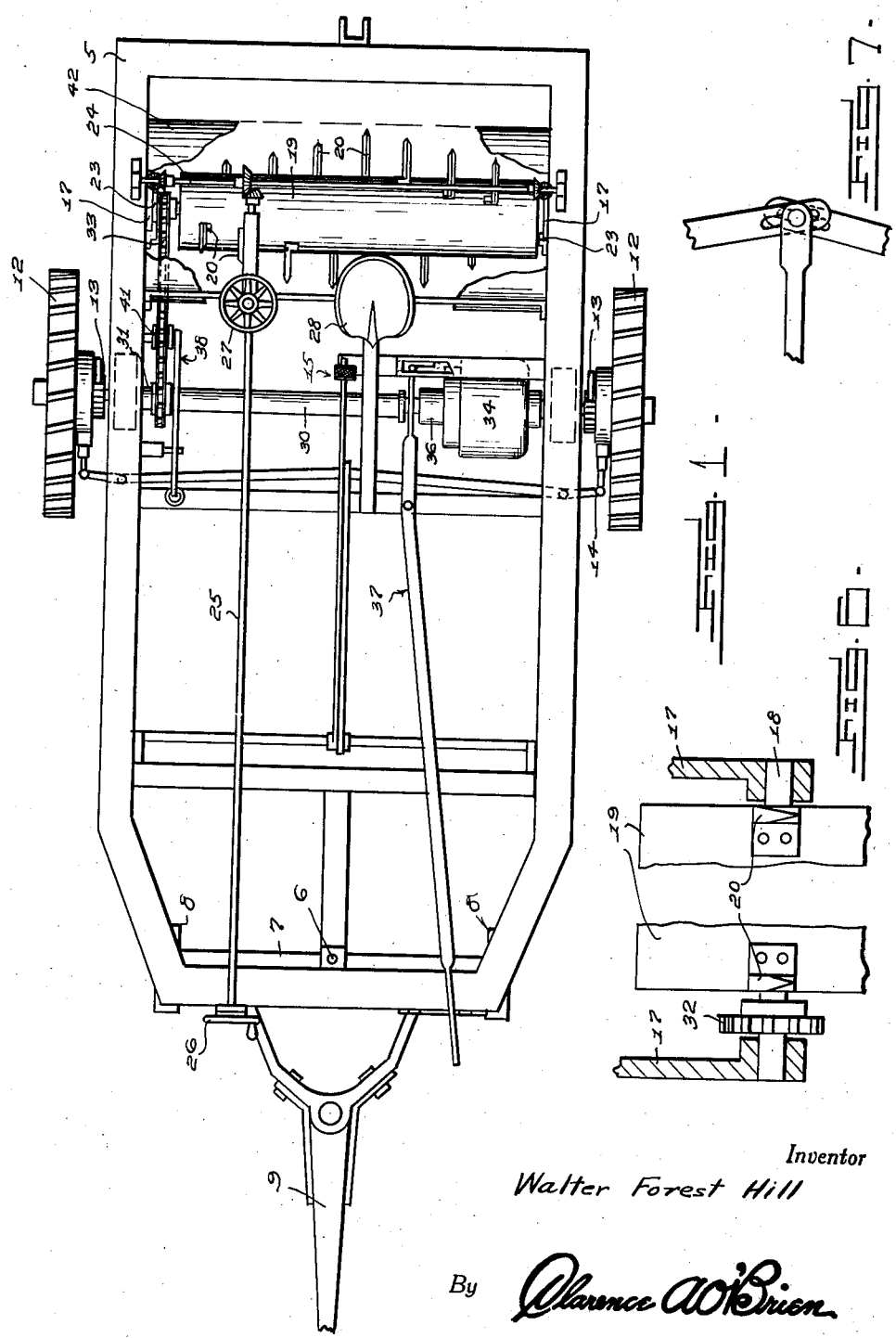
Inventor
Walter Forest Hill
By Clarence A. O'Brien
Attorney Sept. 23, 1941.  W. F. HILL  2,256,593
HARROW
Filed Oct. 1, 1940   3 Sheets-Sheet 2
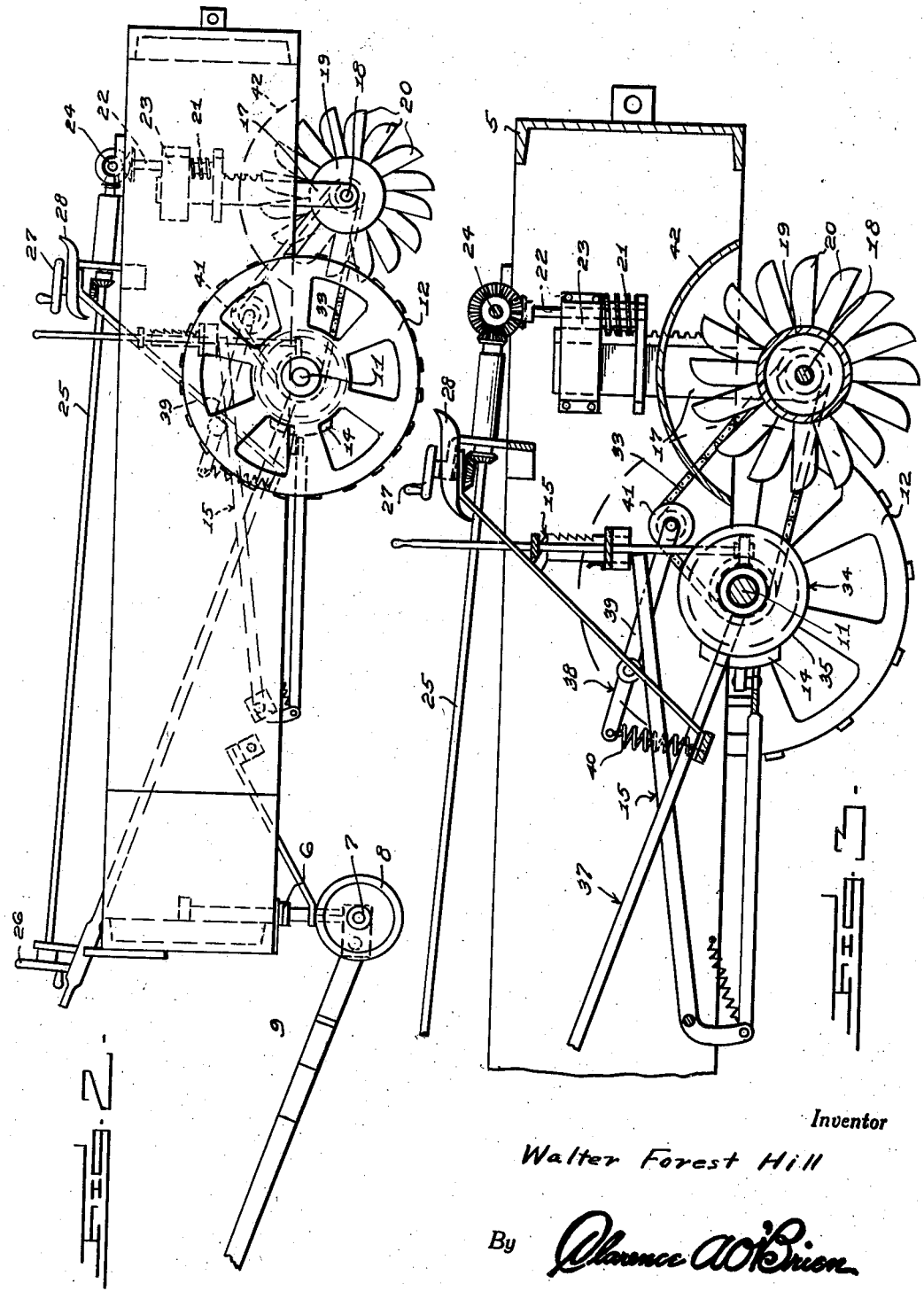
Inventor
Walter Forest Hill
By Clarence A. O'Brien
Attorney

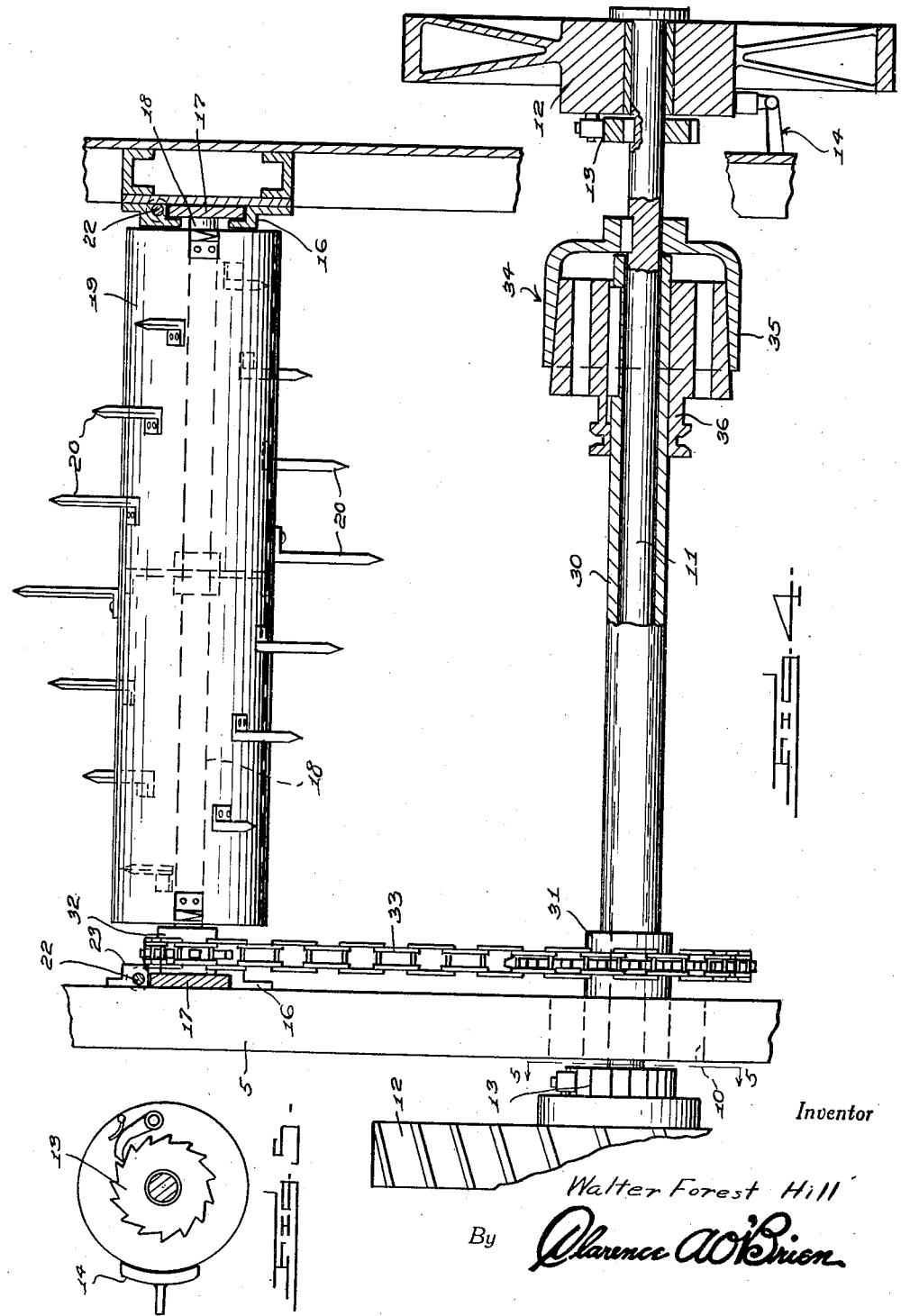

Patented Sept. 23, 1941

2,256,593

UNITED STATES PATENT OFFICE 2,256,593

HARROW

Walter Forest Hill, Cincinnati, Ohio, assignor of one-half to John J. Kohler, Newport, Ky.

Application October 1, 1940, Serial No. 359,286

2 Claims. (Cl. 97—40)

This invention relates to a rotary type harrow especially adapted for pulverizing soil and may be mechanically driven or drawn by animals if desired. The primary object of the invention is the provision of a wheel type harrow including a driven toothed rotatable cylinder for acting on the soil and which may be easily and quickly adjusted to regulate the depth of its action in the soil or may be raised to completely clear the soil and obstructions thereon of an average height.

Another object of this invention is the provision of a drive means for the cylinder in which power is derived from certain ground wheels of the device and which may be rendered operative and inoperative as desired.

With these and other objects in view as will become more apparent as the description proceeds, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a wheel type harrow constructed in accordance with my invention.

Figure 2 is a side elevation illustrating the device.

Figure 3 is an enlarged vertical sectional view illustrating the means of adjusting the elevation of the harrow drum or cylinder with respect to the ground and also the drive means between said drum or cylinder and ground wheels of the device.

Figure 4 is a fragmentary longitudinal sectional view illustrating the drive means.

Figure 5 is a detail sectional view taken on the line 5—5 of Figure 4.

Figure 6 is a fragmentary sectional view, illustrating the journals for the shaft of the cylinder or drum of the device.

Figure 7 is a fragmentary plan view illustrating portions of the brake beams and the connection of an operating bell crank lever thereto.

Referring in detail to the drawings, the numeral 5 indicates a main frame of substantially rectangular shape and mounted upon the forward end of said frame by a king pin 6 is a front axle 7 having journaled thereon front wheels 8. A draft tongue 9 of any suitable construction is connected to the front axle to permit coupling of this device to a tractor if desired, or to hitch draft animals thereto.

At a selected distance forwardly of the rear end of the frame 5 journals 10 are provided for rotatably supporting a rear axle 11 and journaled on the latter are traction type rear wheels 12. Ratchet mechanisms 13 are employed for establishing a drive between the rear wheels and the axle 11.

A suitable brake mechanism 14 is provided for retarding the traction wheels 12 when desired and is suitably mounted on the frame 5 and includes an operating medium 15.

Located on the frame 5 rearwardly of the traction wheels 12 are vertically arranged guides 16 which slidably support for vertical movement rack bars 17. The rack bars are connected by a shaft 18 on which is secured a drum or cylinder 19. This drum or cylinder may be raised and lowered with respect to the ground and has secured thereon a plurality of teeth 20 for digging or biting into the soil for the purpose of pulverizing the latter. It is preferred that the teeth be arranged in rows on the cylinder or drum with the rows extending spirally of the drum or cylinder. It is to be understood that the drum or cylinder is secured to the shaft 18 for rotation therewith and the latter is suitably journaled on the vertically movable rack bars.

Meshing with the rack bars are worms 21 secured on shafts 22 journaled in bearings 23 carried by the frame 5. The shafts 22 are geared to a transversely arranged shaft 24 journaled on the frame 5. An operating shaft 25 is geared to the shaft 24 and extends to the forward end of the frame 5 and is rotatably supported at said end of the frame and further is equipped with a hand wheel 26 for the rotation thereof in opposite directions. The rotation of the operating shaft 25 in opposite directions will bring about raising and lowering of the drum or cylinder 19 with respect to the ground and thereby regulate the depth in which the teeth will act in the soil.

A hand wheel 27 is geared to the operating shaft 25 and is located adjacent an operator's seat 28 mounted on the frame 5 adjacent the rear end thereof. Thus it will be seen that the operating shaft can be manually controlled from the front end of the frame or from a point adjacent the rear end of the frame. The seat 28 is suitably supported on the frame 5 as clearly shown in Figures 2 and 3 of the drawings.

A drive sleeve 30 is journaled on the rear axle 11 and sprocket gears 31 and 32 and a sprocket chain 33 connects said sleeve to the shaft 18 of the cylinder or drum.

A clutch 34 is provided for connecting and disconnecting the rear axle 11 to the drive sleeve 30 and includes clutch elements 35 and 36. The clutch element 35 is secured to the axle 11 while the clutch element 36 is splined to the sleeve 30. A dual control mechanism 37 is connected with the clutch element 36 for the engagement and disengagement thereof with the clutch element 35 to clutch and declutch the drive sleeve 30 with the rear axle 11. The ratchet mechanisms 13 heretofore referred to permit the traction wheels 12 to rotate one faster than the other when the vehicle is turning in either direction.

The dual control mechanism 37 for the clutch 34 extends both to a point adjacent the seat 28 and also to the front end of the frame 5. This permits the operator on the seat 28 to operate the clutch or to permit the operator of the tractor, if the device is used in conjunction therewith, to control the clutch.

A tightener 38 is carried by the frame 5 and engages with the sprocket chain 33 to remove slack therefrom and includes a pivotally mounted lever 39 spring influenced by a spring 40 and a sprocket gear 41 engageable with the sprocket chain, as clearly shown in Figure 3.

A guard or hood 42 is carried by the frame 5 and overlies the cylinder or drum to protect the operator on the seat 28.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a device of the class described, a frame, an axle journaled on said frame, ground traction wheels journaled on the axle, ratchet mechanisms connecting the wheels to the axle, journals slidably mounted on the frame for vertical movement and including rack bars, a drum shaft carried by said journals, a drum including teeth secured on said drum shaft, an adjustable drive means for the drum shaft and including a clutch for clutching and declutching said drive means to the first-named axle, worms engaging the rack bars, shafts secured to said worms, means for journaling the shafts on the frame, and an operating means geared to said shafts.

2. In a harrow, a frame, an axle journaled on said frame, ground traction wheels journaled on said axle, ratchet mechanisms providing drives between the wheels and said axle, rack bars slidably mounted on the frame for vertical movement and including journals, a drum carried by said journals and including teeth to act on the soil, worms meshing with said rack bars, shafts secured to said worms and journaled on the frame, a shaft arranged transversely of the frame and journaled thereon and geared to the first-mentioned shafts, a dual control geared to the second-named shaft, a drive sleeve journaled on the axle, means connecting said sleeve to said drum, a clutch for connecting and disconnecting the sleeve to said axle, and a dual control mounted on the frame and connected to said clutch for the actuation thereof.

WALTER FOREST HILL.